(12) United States Patent
Byun et al.

(10) Patent No.: US 8,758,929 B2
(45) Date of Patent: Jun. 24, 2014

(54) SECONDARY BATTERY

(75) Inventors: Sangwon Byun, Yongin-si (KR);
Jonghwan Lee, Yongin-si (KR);
Minhyung Guen, Yongin-si (KR); Zin Park, Yongin-si (KR); Youngchul Chang, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 380 days.

(21) Appl. No.: 13/180,480

(22) Filed: Jul. 11, 2011

(65) Prior Publication Data

US 2012/0263976 A1    Oct. 18, 2012

(30) Foreign Application Priority Data

Apr. 18, 2011  (KR) ........................ 10-2011-0035805

(51) Int. Cl.
*H01M 2/26*  (2006.01)
(52) U.S. Cl.
USPC ............................. 429/161; 429/163; 429/164
(58) Field of Classification Search
None
See application file for complete search history.

(56) References Cited

U.S. PATENT DOCUMENTS

| | | | |
|---|---|---|---|
| 2006/0019158 A1 * | 1/2006 | Mori et al. | 429/174 |
| 2010/0279156 A1 | 11/2010 | Kim et al. | |
| 2011/0039136 A1 | 2/2011 | Byun et al. | |
| 2011/0052949 A1 | 3/2011 | Byun et al. | |

FOREIGN PATENT DOCUMENTS

| | | | | |
|---|---|---|---|---|
| EP | 0 313 405 A1 | 4/1989 | | |
| EP | 2 348 558 A1 | 7/2011 | | |
| EP | 2 357 685 A1 | 8/2011 | | |
| JP | 05-325943 | 12/1993 | | |
| JP | 08-185850 | 7/1996 | | |
| JP | 2001-148239 | * 5/2001 | ............. | H01M 2/26 |
| JP | 2005-142026 | * 6/2005 | ............ | H01M 10/04 |
| KR | 10-2011-0005197 | 1/2011 | | |
| KR | 2011-0017820 A | 2/2011 | | |
| KR | 2011-0025056 A | 3/2011 | | |

OTHER PUBLICATIONS

English Machine Translation of JP 08-185850 dated Jul. 16, 1996, 11 pages.
KIPO Notice of Allowance for KR 10-2011-0035805 dated Mar. 25, 2013, 5 pages.
English Machine Translation of Patent Publication No. JP 05-325943 dated Dec. 10, 1993, 11 pages.
Extended European Search Report dated Jul. 17, 2012 for corresponding EP 11184423.9, 9 pages.

* cited by examiner

*Primary Examiner* — Cynthia K. Walls
(74) *Attorney, Agent, or Firm* — Christie, Parker & Hale, LLP

(57) ABSTRACT

A secondary battery including an electrode assembly including a first electrode, a second electrode, and a separator between the first and second electrodes; a first collecting part electrically connected to the first electrode; a second collecting part electrically connected to the second electrode; a case configured to receive the electrode assembly; a cap assembly including a cap plate configured to seal an opening of the case; and an auxiliary connection part electrically connected between the second collecting part and the cap plate, and the second collecting part includes at least two fuse parts, a first extension part, and a second extension part connected to the second electrode.

17 Claims, 8 Drawing Sheets

SECONDARY BATTERY

CROSS-REFERENCE TO RELATED APPLICATION

This application claims priority to and the benefit of Korean Patent Application No. 10-2011-0035805, filed on Apr. 18, 2011 in the Korean Intellectual Property Office, the entire content of which is incorporated herein by reference.

BACKGROUND

1. Field

Aspects of embodiments of the present invention relate to a secondary battery.

2. Description of the Related Art

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery may be constructed by forming an electrode assembly by disposing an insulating separator between positive and negative electrode plates; placing the electrode assembly in a case together with electrolyte; and disposing a cap plate on the case. The electrode assembly may be connected to electrode terminals which protrude from the cap plate and are exposed to the exterior of the secondary battery.

SUMMARY

According to an aspect of embodiments of the present invention, a secondary battery includes an auxiliary connection part electrically connected from a collecting part to a cap plate or a case.

According to another aspect of embodiments of the present invention, a secondary battery includes at least two fuse parts at a collecting part to interrupt an outward current when the secondary battery is overcharged. Secondary batteries according to embodiments of the present invention may thereby have improved safety as a motor-driving power source for propelling electric scooters, hybrid vehicles, or electric vehicles.

According to at least one embodiment of the present invention, a secondary battery includes: an electrode assembly including a first electrode, a second electrode, and a separator between the first and second electrodes; a first collecting part electrically connected to the first electrode; a second collecting part electrically connected to the second electrode; a case configured to receive the electrode assembly; a cap assembly including a cap plate configured to seal an opening of the case; and an auxiliary connection part electrically connected between the second collecting part and the cap plate, and the second collecting part includes at least two fuse parts, a first extension part, and a second extension part connected to the second electrode.

The at least two fuse parts may include first and second fuse parts arranged on the second collecting part and spaced apart from each other, and the first and second fuse parts may include penetration holes formed through the second collecting part, respectively.

The first extension part may be fixed to and electrically connected to a bottom surface of the cap plate, and the first and second fuse parts may be arranged on the second extension part extending at an angle from the first extension part.

In one embodiment, the second extension part includes a fixing part between the first fuse part and the second fuse part, and a first end of the auxiliary connection part is connected to the fixing part, and a second end of the auxiliary connection part is connected to a bottom surface of the cap plate.

The penetration hole of the first fuse part may be larger than the penetration hole of the second fuse part.

In one embodiment, the second extension part includes a fixing part between the first fuse part and the second fuse part, and a first end of the auxiliary connection part is connected to the fixing part, and a second end of the auxiliary connection part is connected to an inner side of the case.

The first collecting part may include a first electrode terminal inserted through a first terminal hole of the cap plate, the first electrode terminal may include a short-circuit plate, the cap plate may have a short-circuit hole at a location corresponding to the short-circuit plate, and the cap assembly may further include a short-circuit member covering the short-circuit hole.

The short-circuit member may include a reversible plate including an edge part fixed to the cap plate, and a convex part extending from the edge part into the short-circuit hole.

The convex part may be configured to contact the short-circuit plate when an inside pressure of the secondary battery exceeds a reference pressure.

In one embodiment, when the convex part contacts the short-circuit plate, the first and second fuse parts are configured to disconnect at regions between edges of the penetration holes of the respective first and second fuse parts and edges of the second extension part to interrupt a current.

The first and second collecting parts may include first and second electrode terminals protruding outward from the cap plate, respectively.

The at least two fuse parts may include a first fuse part arranged on the first extension part, and a second fuse part arranged on the second extension part extending at an angle from the first extension part.

The first and second electrode terminals may be inserted through terminal holes formed in the cap plate and protrude outward from the cap plate, the first electrode terminal may include a short-circuit plate, the cap plate may have a short-circuit hole at a location corresponding to the short-circuit plate, and the cap assembly may further include a short-circuit member covering the short-circuit hole.

The secondary battery may further include insulation members between the cap plate and the first and second electrode terminals.

BRIEF DESCRIPTION OF THE DRAWINGS

The accompanying drawings are included to provide a further understanding of the present disclosure, and are incorporated in and constitute a part of the disclosure. The drawings illustrate some exemplary embodiments of the present invention and, together with the description, serve to explain principles of the present invention, wherein.

DETAILED DESCRIPTION

Figure 1:
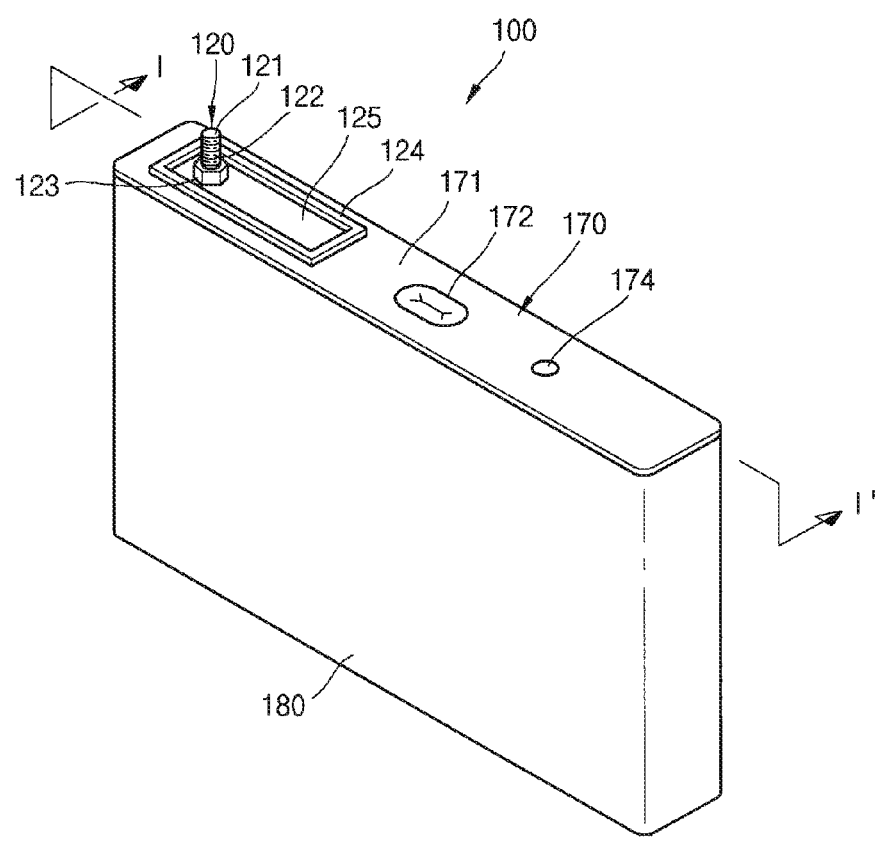
FIG. 1 is a perspective view of a secondary battery according to an embodiment of the present invention.

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

In the following description, like reference numerals designate like elements throughout. In addition, when a part is referred to as being electrically connected to another part, it can be directly connected to the other part, or intervening parts may also be present.

Figure 2:
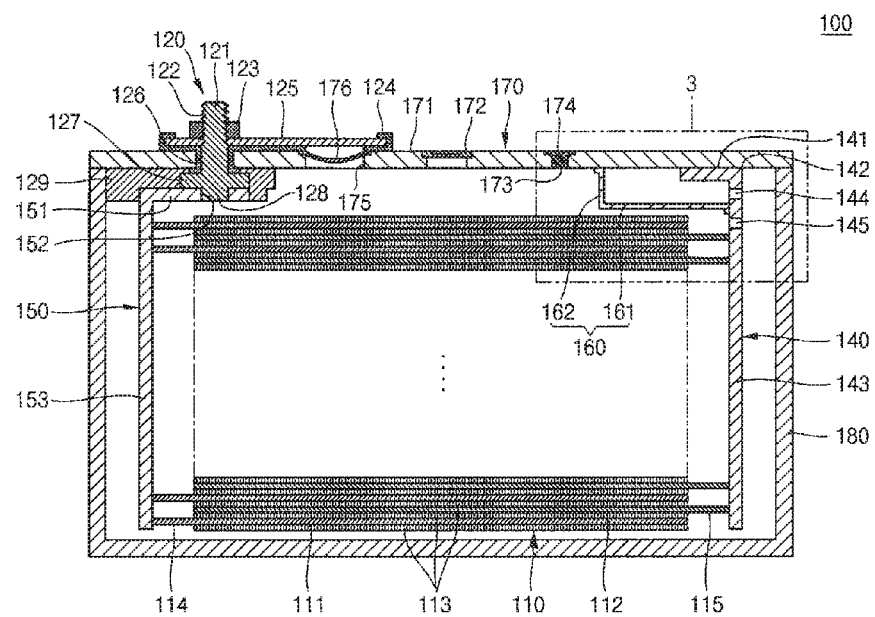
FIG. 2 is a sectional view of the secondary battery of FIG. 1, taken along the line I-I'.
Figure 3:
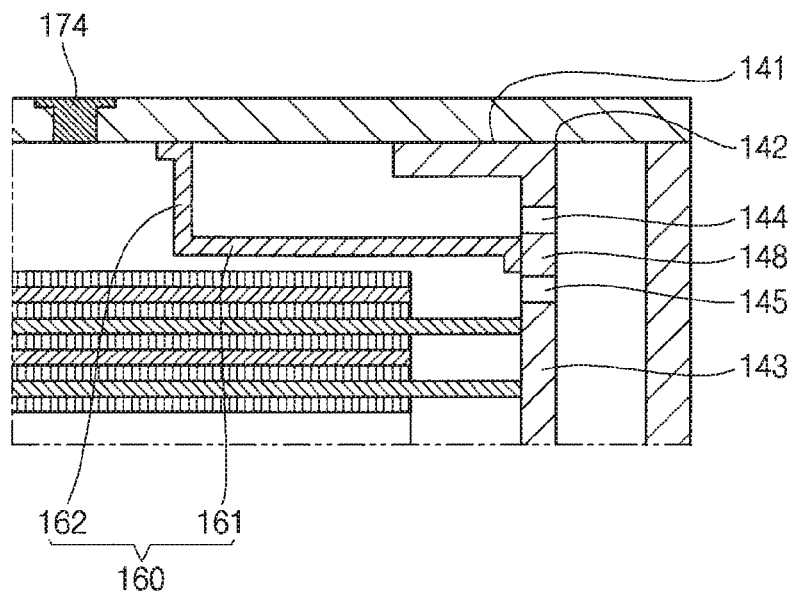
FIG. 3 is a detailed view of the region 3 of FIG. 2.
Figure 4A:
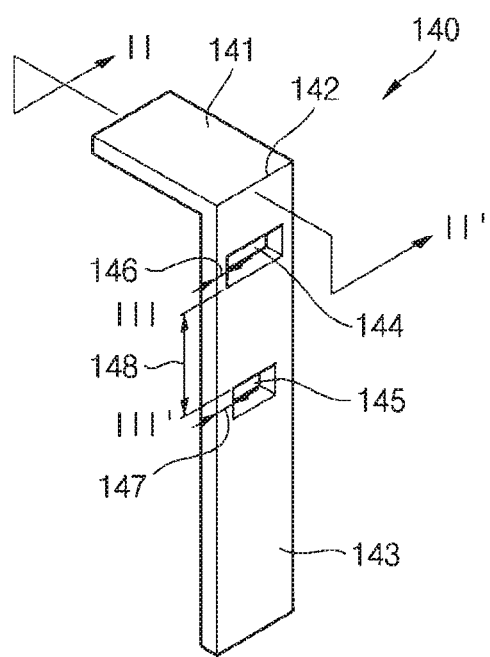
FIG. 4A is a perspective view of a collecting part of the secondary battery of FIG. 1.
Figure 4B:
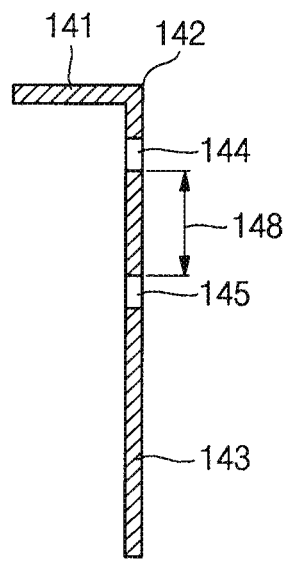
FIG. 4B is a sectional view of the collecting part of FIG. 4A, taken along the line II-II'.
Figure 4C:
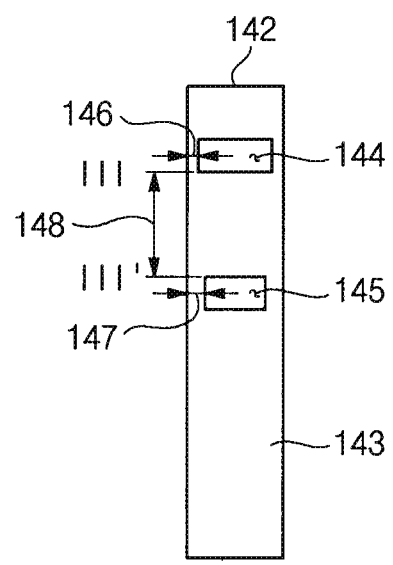
FIG. 4C is a side view of the collecting part of FIG. 4A.
Figure 5A:
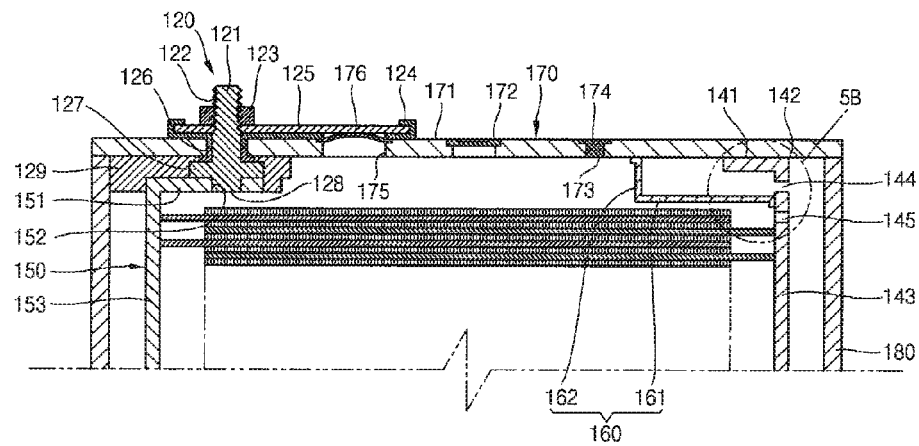
FIG. 5A is a partial sectional view of the secondary battery of FIG. 1, shown in a state in which a first fuse part is in a disconnected state.
Figure 5B:
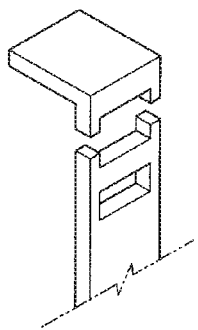
FIG. 5B is a schematic perspective view of a portion of the collecting part, shown at the region 5B of FIG. 5A and showing the first fuse part in the disconnected state.
Figure 5C:
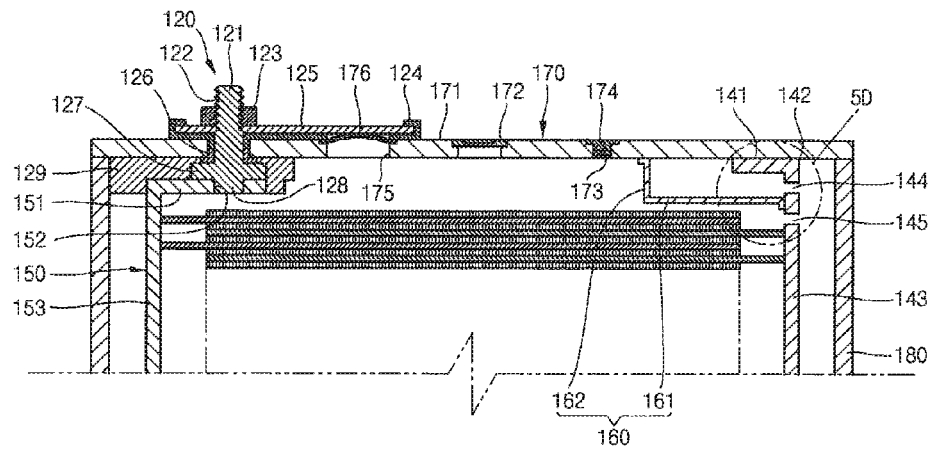
FIG. 5C is a partial sectional view of the secondary battery of FIG. 1, shown in a state in which the first fuse part and a second fuse part are in a disconnected state.
Figure 5D:
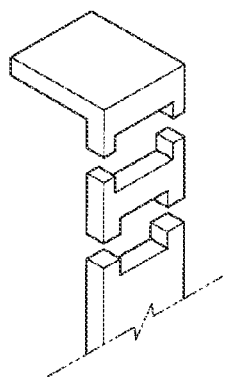
FIG. 5D is a schematic perspective view of a portion of the collecting part, shown at the region 5D of FIG. 5C and showing the first fuse part and the second fuse part in the disconnected state.
Figure 6:
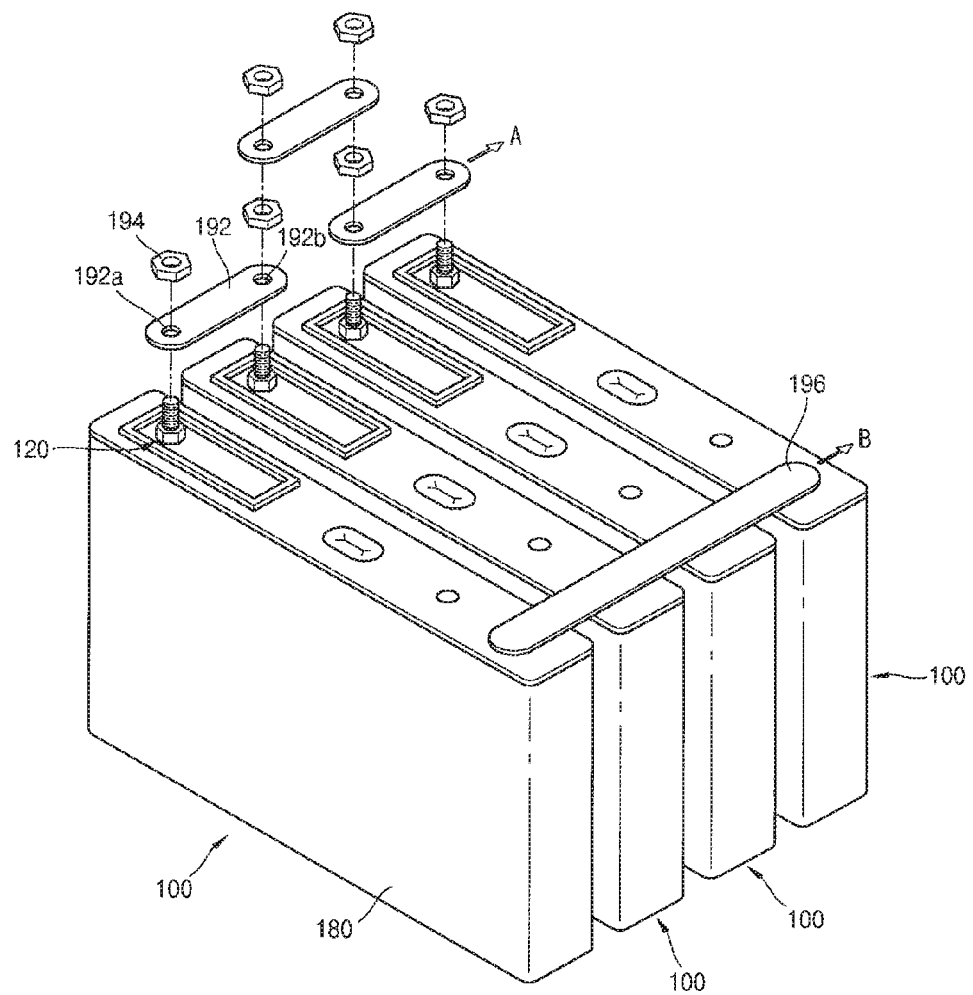
FIG. 6 is a partially exploded perspective view of a battery pack in which secondary batteries are arranged in parallel.

FIG. 1 is a perspective view of a secondary battery according to an embodiment of the present invention. FIG. 2 is a sectional view of the secondary battery, taken along the line I-I' of FIG. 1. FIG. 3 is a detailed view of the region 3 of FIG. 2. FIG. 4A is a perspective view illustrating a collecting part of the secondary battery. FIG. 4B is a sectional view of the collecting part, taken along the line II-II' of FIG. 4A. FIG. 4C is a side view of the collecting part of FIG. 4A. FIGS. 5A-5D illustrate an order in which the secondary battery of FIG. 1 is short-circuited. FIG. 6 is a partially exploded perspective view of a battery pack in which secondary batteries, such as the secondary battery of FIG. 1, are arranged in parallel.

Referring to FIGS. 1 through 6, a secondary battery 100 according to an embodiment of the present invention includes an electrode assembly 110, a first electrode terminal 120, a first collecting part 150, a second collecting part 140, an auxiliary connection part 160, a cap assembly 170, and a case 180.

The electrode assembly 110 is formed by winding or stacking a first electrode 111, a separator 113, and a second electrode 112, which have a thin plate or film shape. The first electrode 111 may function as a negative electrode, and the second electrode 112 may function as a positive electrode. Alternatively, the first electrode 111 may function as a positive electrode, and the second electrode 112 may function as a negative electrode.

The electrode assembly 110 is accommodated in the case 180 together with electrolyte. The electrolyte may include an organic solvent, such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

The first electrode 111 is formed by applying a first electrode active material, such as graphite or carbon, to a first electrode collector formed of metal foil, such as copper or nickel foil. The first electrode collector includes a first electrode non-coating portion 114 to which the first electrode active material is not applied. The first electrode non-coating portion 114 functions as a current path between the first electrode 111 and the outside of the first electrode 111. In embodiments of the present invention, materials that can be used to form the first electrode 111 are not limited to the materials described above.

The second electrode 112 is formed by applying a second electrode active material, such as a transition metal oxide, to a second electrode collector formed of metal foil, such as aluminum foil. The second electrode collector includes a second electrode non-coating portion 115 to which the second electrode active material is not applied. The second electrode non-coating portion 115 functions as a current path between the second electrode 112 and the outside of the second electrode 112. In embodiments of the present invention, materials that can be used to form the second electrode 112 are not limited to the materials described above.

The separator 113 is disposed between the first electrode 111 and the second electrode 112. The separator 113 prevents or substantially prevents a short circuit and allows movement of lithium ions. In one embodiment, the separator 113 may be formed of a polyethylene film or a film including polyethylene and polypropylene. However, in embodiments of the present invention, materials that can be used to form the separator 113 are not limited to the materials described above.

The electrode assembly 110, in one embodiment, is formed by winding the first electrode 111, the separator 113, and the second electrode 112 in a manner such that the first and second electrode non-coating portions 114 and 115 protrude from upper and lower ends of the electrode assembly 110.

The first and second collecting parts 150 and 140 are coupled to both end parts of the electrode assembly 110 such that the first and second collecting parts 150 and 140 are electrically connected to the first and second electrodes 111 and 112, respectively. The secondary battery 100 includes a first electrode terminal 120 electrically connected to the first collecting part 150.

The first electrode terminal 120 may be formed of a metal or an equivalent thereof, and is electrically connected to the first collecting part 150. The first electrode terminal 120, in one embodiment, includes a first terminal column 121, a first terminal nut 123, a first upper insulator 124, and a short-circuit plate 125.

The first terminal column 121 is inserted through a cap plate 171 of the cap assembly 170 and protrudes upward from the cap plate 171 by a predetermined length. The first terminal column 121 is electrically connected to the first collecting part 150 on an inner side of the cap plate 171. A screw thread 122 may be formed on the outwardly-protruding outer surface of the first terminal column 121. The screw thread 122 may be inserted through holes 192a and 192b of bus bars 192 (see FIG. 6), and a nut 194 may be coupled to the screw thread 122. The screw thread 122 is engaged with the first terminal nut 123 so that the first terminal column 121 may be firmly coupled to the cap assembly 170, as is described in further detail later herein.

The first electrode terminal 120 includes the short-circuit plate 125. The short-circuit plate 125 may have a plate shape. The short-circuit plate 125 is spaced apart from a side (e.g., a top side) of a short-circuit member 176, as is described in further detail later herein. The first upper insulator 124 insulates the short-circuit plate 125 from the cap plate 171. The short-circuit plate 125, in one embodiment, is electrically connected to the first terminal column 121 in a state where the short-circuit plate 125 is firmly fixed to the first terminal column 121 by the first terminal nut 123.

The first terminal column 121, in one embodiment, includes a laterally extending flange 127 so that the first terminal column 121 cannot be detached from a terminal hole of the cap plate 171. A gasket 126 may be disposed between the terminal hole of the cap plate 171 and the first terminal column 121 for sealing therebetween. The gasket 126 may be formed of an insulating material.

In one embodiment, a protrusion 128 is formed on the bottom side of the flange 127. The protrusion 128 is inserted in a terminal hole 152 of the first collecting part 150, as described in further detail later herein.

The first collecting part 150 is formed of a metal or an equivalent thereof. In one embodiment, the first collecting part 150 may be formed of copper or a copper alloy. However, the material of the first collecting part 150 is not limited thereto. The first collecting part 150 includes a first extension part 151 and a second extension part 153. The first collecting part 150, in one embodiment, has a generally reverse L-shape. The terminal hole 152 is formed in the first extension part 151. The protrusion 128 is inserted in the terminal hole 152 such that the protrusion 128 is electrically connected to the first extension part 151. The second extension part 153 is connected to the first electrode non-coating portion 114 of the electrode assembly 110.

The second collecting part 140 is formed of a metal or an equivalent thereof. In one embodiment, the second collecting part 140 may be formed of nickel. However, the material of the second collecting part 140 is not limited thereto.

The second collecting part 140, in one embodiment, includes a first extension part 141, a bent part 142, a second extension part 143, a first fuse part 144, and a second fuse part 145.

The second collecting part 140, in one embodiment, is bent at the bent part 142 in a generally reverse L-shape.

The first extension part 141, in one embodiment, is parallel with a bottom surface of the cap plate 171 and is electrically connected to the bottom surface of the cap plate 171. In the second collecting part 140, the bent part 142 is bent from the first extension part 141, and the second extension part 143 extends from the bent part 142.

Referring to FIGS. 4A through 4C, in one embodiment, the first fuse part 144 and the second fuse part 145 are spaced apart from each other on the second extension part 143. The second extension part 143 is connected to the second electrode non-coating portion 115 of the electrode assembly 110. The first fuse part 144 may include a hole or recess (e.g., a penetration hole) formed through the second extension part 143. In one embodiment, the first fuse part 144 may include a penetration hole having a rectangular or circular shape. Further, the second fuse part 145 may include a hole or recess (e.g., a penetration hole) formed through the second extension part 143. In one embodiment, the second fuse part 145 may include a penetration hole having a rectangular or circular shape penetration hole. In one embodiment, the penetration hole of the first fuse part 144 is larger than the penetration hole of the second fuse part 145, such that a width 146 from an edge of the first fuse part 144 to an edge of the second extension part 143 is less than a width 147 from an edge of the second fuse part 145 to the edge of the second extension part 143.

A cross-sectional area of the first fuse part 144 is smaller than a cross-sectional area of the second extension part 143 where no penetration hole is formed. Therefore, the resistance of the second extension part 143 is increased at a region around the first fuse part 144. If an excessive current flows through the first fuse part 144, then the first fuse part 144 melts at regions corresponding to the width 146 defined from the edge of the first fuse part 144 to the edge of the second extension part 143, and thus the second extension part 143 breaks, as shown in FIGS. 5A and 5B. This will be referred to as a first current interruption. Although the second extension part 143 breaks, since the auxiliary connection part 160 is electrically connected to the cap plate 171, a current passage of the secondary battery 100 is not completely interrupted.

In the second extension part 143, the second fuse part 145 is spaced apart (e.g., along a lengthwise direction of the second extension part 143) from the first fuse part 144. The second extension part 143 is connected to the second electrode non-coating portion 115 of the electrode assembly 110. The second fuse part 145 may include a penetration hole having a rectangular or circular shape. In one embodiment, the penetration hole of the second fuse part 145 is smaller than the penetration hole of the first fuse part 144.

The cross-sectional area of the second fuse part 145 is smaller than the cross-sectional area of the second extension part 143 where no penetration hole is formed. Therefore, the resistance of the second extension part 143 is increased at a region around the second fuse part 145. If an excessive current flows through the second fuse part 145, then the second fuse part 145 melts at regions corresponding to the width 147 defined from the edge of the second fuse part 145 to the edge of the second extension part 143, and thus the second extension part 143 breaks, as shown in FIGS. 5C and 5D. This will be referred to as a second current interruption.

Portions of the second extension part 143, that is, the first and second fuse parts 144 and 145, may melt due to a residual current in the secondary battery 100. In one embodiment, the penetration hole of the first fuse part 144 is larger than the penetration hole of the second fuse part 145. The width 146 from the edge of the first fuse part 144 to the edge of the second extension part 143 is less than the width 147 from the edge of the second fuse part 145 to the edge of the second extension part 143. Therefore, the resistance of the first fuse part 144 is greater than the resistance of the second fuse part 145. As a result, the first fuse part 144 and the second fuse part 145 can melt sequentially to interrupt a current.

The second extension part 143 includes a fixing part 148 in a region between the first fuse part 144 and the second fuse part 145 (e.g., in a region indicated by an imaginary edge line III extending from an edge of the first fuse part 144 and an imaginary line edge III' extending from an edge of the second fuse part 145). An end of the auxiliary connection part 160 is connected to the fixing part 148.

The auxiliary connection part 160, in one embodiment, includes a first connection member 161 and a second connection member 162. In the secondary battery 100, the auxiliary connection part 160 connects the second collecting part 140 and the cap plate 171.

Referring to FIG. 3, in one embodiment, the first connection member 161 of the auxiliary connection part 160 is parallel with the cap plate 171, and the second connection member 162 of the auxiliary connection part 160 is bent from the first connection member 161 and extends parallel with the second extension part 143. The auxiliary connection part 160 may be formed of a conductive material, such as aluminum, aluminum alloy, and steel plated with nickel. Due to the auxiliary connection part 160, the cap plate 171 and the second electrode 112 can be electrically connected to each other in the secondary battery 100.

With reference to FIG. 3, the first connection member 161 is fixed to the fixing part 148. The fixing part 148 is disposed between the imaginary edge line III of the first fuse part 144 and the imaginary edge line III' of the second fuse part 145.

The second connection member 162, in one embodiment, is fixed to the bottom surface of the cap plate 171.

In one embodiment, ends of the first and second connection members 161 and 162 may be bent. The bent ends of the first and second connection members 161 and 162 may be fixed to the fixing part 148 and the bottom surface of the cap plate 171 by using a resistance welding method or a conductive adhesive. However, the fixing method of the auxiliary connection part 160 is not limited thereto.

If the temperature and pressure of the secondary battery 100 are increased due to overcharging, the secondary battery 100 is short-circuited as the short-circuit member 176 is reversed, or protruded upward, to make contact with the short-circuit plate 125 of the first electrode terminal 120. After the secondary battery 100 is short-circuited, the second extension part 143 is sequentially melted (i.e. at the first fuse part 144 and the second fuse part 145) by a residual current in the secondary battery 100.

Secondary batteries such as the secondary battery 100 may be connected in parallel. The number of secondary batteries that can be connected in parallel is not limited.

As shown in FIG. 6, secondary batteries 100, in one embodiment, may be connected in parallel by using bus bars 192 and a parallel connection member 196. The secondary batteries 100 may be connected in parallel by connecting first electrodes (A) and second electrodes (B) as shown in FIG. 6. A current flow between the secondary batteries 100 according to the present invention connected through the bus bars 192 may be interrupted. Although one of the secondary batteries 100 connected in parallel is overcharged, a current flow from the overcharged secondary battery 100 to another secondary battery 100 connected to the overcharged secondary battery 100 can be interrupted, and thus the secondary batteries 100 can be used stably.

If both the first and second fuse parts 144 and 145 break, the secondary battery 100 is not charged any more because a current to the auxiliary connection part 160 is interrupted, and thus the secondary battery 100 can be used more stably.

The cap assembly 170, in one embodiment, includes the cap plate 171, a safety vent 172, an electrolyte injection hole 173, and a plug 174. In addition, the cap assembly 170 further includes a short-circuit hole 175 and the short-circuit member 176 covering the short-circuit hole 175.

The cap plate 171 seals the case 180. The first electrode terminal 120 is inserted in the terminal hole of the cap plate 171 and is connected to the first collecting part 150. After electrolyte is injected through the electrolyte injection hole 173 formed in the cap plate 171 of the cap assembly 170, the electrolyte injection hole 173 is closed with the plug 174. The cap plate 171 may include the safety vent 172. The safety vent 172 has a thin thickness such that if the inside pressure of the secondary battery 100 increases to or exceeds a certain pressure, the safety vent 172 may be broken to release gas.

In one embodiment, a lower insulation member 129 is disposed on the bottom side of the cap plate 171. An electrode terminal accommodation space may be formed in the lower insulation member 129.

The lower insulation member 129 prevents or substantially prevents a short circuit between the cap plate 171 and the first electrode terminal 120. The lower insulation member 129 may be formed of an insulative material, such as polyphenylene sulfide (PPS). However, the material of the lower insulation member 129 is not limited thereto.

The short-circuit member 176 covers the short-circuit hole 175 of the cap plate 171. The short-circuit member 176 has a downwardly convex plate shape when the inside the case 180 is at a normal operating pressure. If the pressure inside of the case 180 and the cap assembly 170 increases to a pressure greater than a certain amount (e.g., a set or predetermined value), the short-circuit member 176 is reversed into an upwardly convex shape. The short-circuit member 176 and the cap plate 171 have the same polarity. When the short-circuit member 176 is reversed into the upwardly convex shape, the short-circuit member 176 comes into contact with a bottom surface of the short-circuit plate 125 which is disposed above the short-circuit member 176, and thus a short circuit is formed because the short-circuit plate 125 and the short-circuit member 176 have different electrical polarities.

The case 180, in one embodiment, is formed of a conductive metal, such as aluminum, aluminum alloy, or steel plated with nickel. The case 180 has a generally hexahedral shape with an opening such that the electrode assembly 110 and the first electrode terminal 120 can be inserted and placed in the case 180. The secondary battery 100 is sealed by coupling the cap assembly 170 to the opening of the case 180. In one embodiment, the inner surface of the case 180 is treated to be electrically insulated from the electrode assembly 110, the first electrode terminal 120, and the cap assembly 170.

A secondary battery 200 according to another embodiment of the present invention is described below with reference to FIG. 7.

Figure 7:
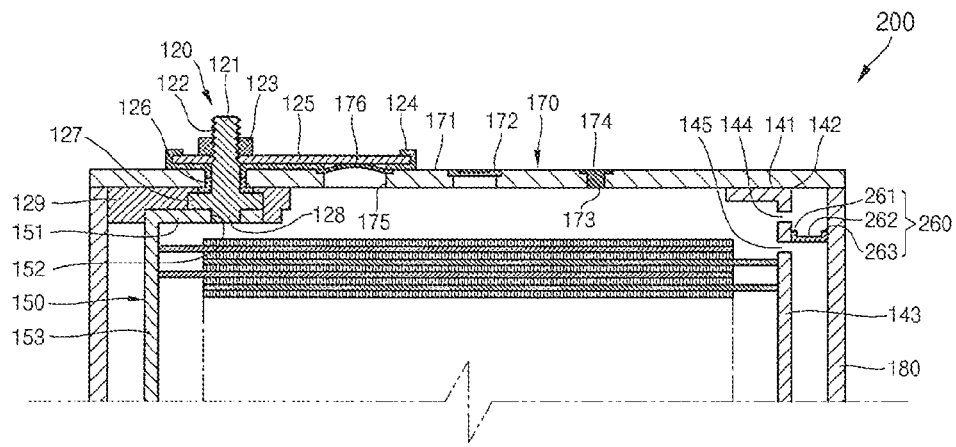
FIG. 7 is a partial sectional view of a secondary battery according to another embodiment of the present invention, shown in a state in which a first fuse part and a second fuse part are in a disconnected state.

FIG. 7 is a partial sectional view of the secondary battery 200 according to another embodiment. FIG. 7 depicts a state of the secondary battery 200 corresponding to that of the secondary battery 100 shown in FIG. 5C.

The secondary battery 200 shown in FIG. 7 has the same structure and function as the secondary battery 100 described above, except that the secondary battery 200 includes a connection member 260 which differs from the auxiliary connection part 160 of the secondary battery 100. Thus, description of the same elements will not be repeated. Instead, the connection member 260 and the case 180 will be mainly described.

Referring to FIG. 7, the connection member 260 electrically connects the second collecting part 140 and the case 180. The case 180 is sealed with the cap assembly 170 and is formed of a conductive metal. Thus, the connection member 260 may be connected to an inner surface of the case 180. In one embodiment, a portion of the case 180 to which the connection member 260 is connected is not insulated. The connection member 260, in one embodiment, is disposed between the case 180 and the second extension part 143 of the second collecting part 140. In one embodiment, ends 261 and 263 of the connection member 260 are bent. The bent ends 261 and 263 of the connection member 260 may be connected to the second extension part 143 and the inner surface of the case 180 (e.g., using a resistance welding method or a conductive adhesive), and the cap plate 171 may be disposed on the case 180. However, the fixing method of the connection member 260 is not limited to the methods described above.

In one embodiment, if the temperature and pressure of the secondary battery 200 are increased (e.g., due to overcharging), the secondary battery 200 is short-circuited when the short-circuit member 176 is reversed to make contact with the short-circuit plate 125 of the first electrode terminal 120. After the secondary battery 200 is short-circuited, the second extension part 143 is sequentially melted (i.e. at the first fuse part 144 and the second fuse part 145) by a residual current in the secondary battery 200 so that a current may not flow from the secondary battery 200 to an outside circuit.

A secondary battery 300 according to another embodiment of the present invention is described below with reference to FIGS. 8A through 8D.

FIGS. 8A through 8D depict an order in which the secondary battery 300 according to an embodiment of the present invention is short-circuited. FIGS. 8A through 8D correspond to FIGS. 5A through 5D, respectively, which depict an order in which the secondary battery 100 described above is short-circuited.

The secondary battery 300 shown in FIGS. 8A through 8D has the same structure and function as the secondary battery 100 described above, except that the secondary battery 300 further includes a second electrode terminal 130, and includes a cap assembly 370 and a second collecting part 340 which differ from the cap assembly 170 and the second collecting part 140 of the secondary battery 100. Therefore, description of the same elements will not be repeated. Instead, the second electrode terminal 130, the cap assembly 370, and the second collecting part 340 will be mainly described.

Figure 8A:
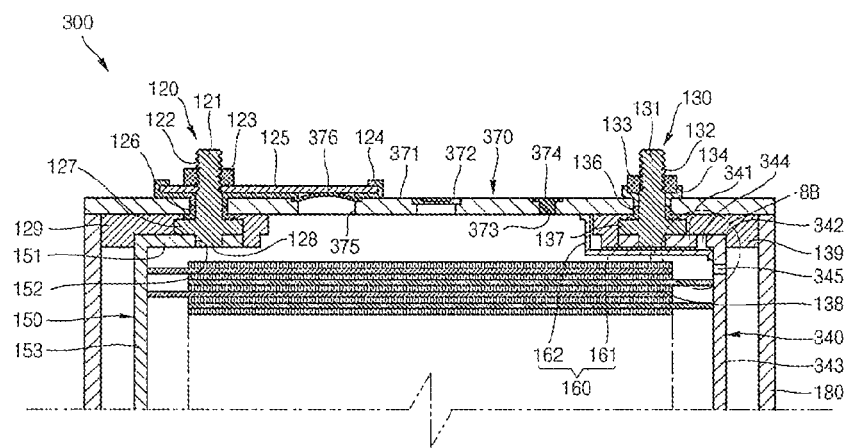
FIG. 8A is a partial sectional view of a secondary battery according to another embodiment of the present invention, shown in a state in which a first fuse part is in a disconnected state.
Figure 8B:
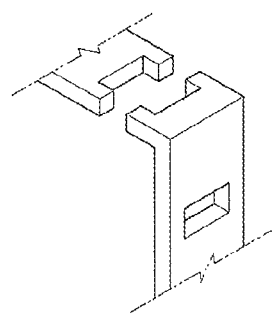
FIG. 8B is a schematic perspective view of a portion of a collecting part of the secondary battery of FIG. 8A, shown at the region 8B of FIG. 8A and showing the first fuse part in the disconnected state.
Figure 8C:
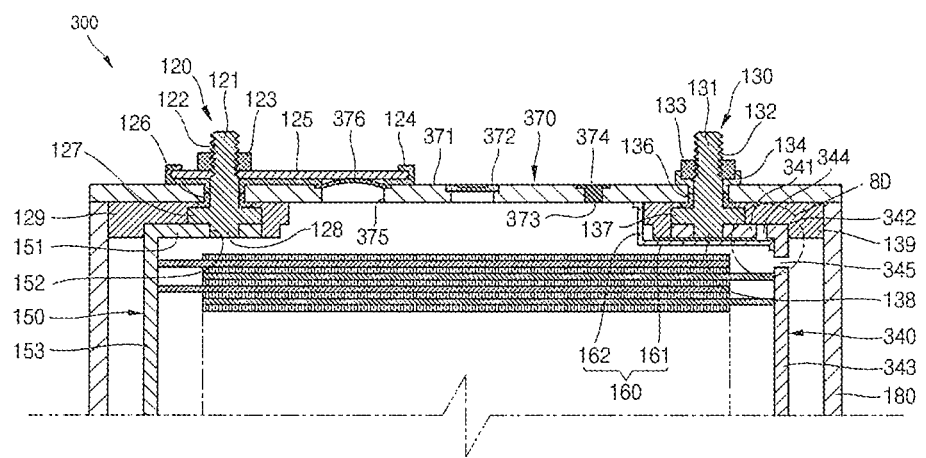
FIG. 8C is a partial sectional view of the secondary battery of FIG. 8A, shown in a state in which the first fuse part and a second fuse part are in a disconnected state.
Figure 8D:
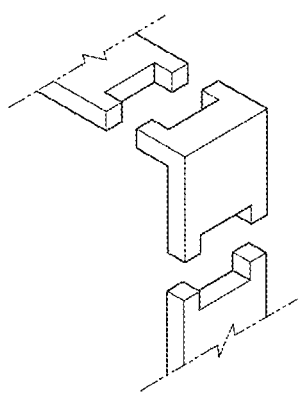
FIG. 8D is a schematic perspective view of a portion of the collecting part of the secondary battery of FIG. 8A, shown at the region 8D of FIG. 8C and showing the first fuse part and the second fuse part in the disconnected state.

Referring to FIGS. 8A and 8C, the second electrode terminal 130 may be formed of a metal or an equivalent thereof. The second electrode terminal 130 is electrically connected to the second collecting part 340, described in further detail later herein. The second electrode terminal 130, in one embodiment, includes a second terminal column 131, a second terminal nut 133, and a second upper insulator 134.

The second terminal column 131, a screw thread 132 of the second terminal column 131, and the second terminal nut 133 may have the same structures as the first terminal column 121, the screw thread 122 of the first terminal column 121, and the first terminal nut 123. Therefore, further descriptions thereof will not be repeated.

The second upper insulator 134 and a gasket 136 are disposed between the second terminal column 131 and a terminal hole of a cap plate 371 for sealing. The gasket 136 may be formed of an insulating material.

In one embodiment, a protrusion 138 is formed on a bottom side of a flange 137 of the second terminal column 131. The protrusion 138, in one embodiment, is inserted in a terminal hole of the second collecting part 340 for electrical connection with the second collecting part 340.

The second collecting part 340 is formed of a conductive metal or an equivalent thereof. For example, the second collecting part 340 may be formed of a conductive metal, such as nickel. However, the material of the second collecting part 340 is not limited thereto.

The second collecting part 340, in one embodiment, includes a first extension part 341, a bent part 342, a second extension part 343, a first fuse part 344, and a second fuse part 345.

In one embodiment, the second collecting part 340 is bent at the bent part 342 and has a generally reverse L-shape.

The first extension part 341 includes a terminal hole and the first fuse part 344. The protrusion 138 formed on the bottom side of the flange 137 is inserted in the terminal hole. The first fuse part 344 includes a recess or hole (e.g. a penetration hole) formed through a portion of the first extension part 341. The first fuse part 344, in one embodiment, has a penetration hole having a rectangular or circular shape. In one embodiment, the penetration hole of the first fuse part 344 is smaller than a penetration hole of the second fuse part 345. The cross-sectional area of the first fuse part 344 is smaller than the cross-sectional area of the first extension part 341 where no penetration hole is formed. Therefore, the resistance of the first extension part 341 is increased at a region around the first fuse part 344. The first fuse part 344 is configured to melt at regions from edges of the first fuse part 344 to edges of the first extension part 341, in which case the first extension part 341 breaks, as shown in FIGS. 8A and 8B. This will be referred to as a first current interruption. Therefore, although a short-circuit member 376, described in further detail later herein, may be reversed to protrude toward the cap plate 371 and cause a short circuit when the secondary battery 300 is overcharged, a residual current may not flow to an outside part from the secondary battery 300 through the second electrode terminal 130.

The second extension part 343 includes the second fuse part 345. The second extension part 343 is connected to the second electrode non-coating portion 115 of the electrode assembly 110. The second fuse part 345, in one embodiment, includes a hole or recess (e.g., a penetration hole) formed through a portion of the second extension part 343. In one embodiment, the second fuse part 345 includes a penetration hole having a rectangular or circular shape. The penetration hole of the second fuse part 345, in one embodiment, is smaller than the penetration hole of the first fuse part 344. If an excessive current flows through the second fuse part 345, the second fuse part 345 is configured to melt at regions from edges of the second fuse part 345 to edges of the second extension part 343, in which case the second extension part 343 breaks. This will be referred to as a second current interruption. Although the short-circuit member 376 may be reversed and cause a short circuit when the secondary battery 300 is overcharged, since the electrode assembly 110 and the second collecting part 340 of the secondary battery 300 are separated due to the second current interruption, a current does not flow in the secondary battery 300.

A fixing part is disposed between an edge of the first fuse part 344 and an edge of the second fuse part 345. An end of the auxiliary connection part 160 is fixed to the fixing part. The other end of the auxiliary connection part 160 may be connected to a bottom surface of the cap plate 371 or the case 180.

The cap assembly 370, in one embodiment, includes the cap plate 371, a safety vent 372, an electrolyte injection hole 373, and a plug 374. In addition, the cap assembly 370 further includes a short-circuit hole 375 and the short-circuit member 376 covering the short-circuit hole 375.

The cap plate 371 seals the case 180. The cap plate 371 includes a terminal hole. The first electrode terminal 120 is inserted through the terminal hole and connected to the first collecting part 150. In addition, the cap plate 751 further includes another terminal hole. The second electrode terminal 130 is inserted in the other terminal hole and connected to the second collecting part 340. After electrolyte is injected through the electrolyte injection hole 373 formed in the cap plate 371 of the cap assembly 370, the electrolyte injection hole 373 is closed with the plug 374. The cap plate 351 may include the safety vent 372. The safety vent 372 has a thin thickness such that if an inside pressure of the secondary battery 300 increases to or exceeds a certain pressure (e.g., a set value), the safety vent 372 may be broken to release gas.

Lower insulation members 129 and 139, in one embodiment, are disposed on the bottom side of the cap plate 371. Electrode terminal accommodation spaces may be formed in the lower insulation members 129 and 139.

The lower insulation members 129 and 139 prevent or substantially prevent a short circuit between the cap plate 371 and the first and second electrode terminals 120 and 130. In one embodiment, the lower insulation members 129 and 139 may be formed of polyphenylene sulfide (PPS). However, the materials of the lower insulation members 129 and 139 are not limited thereto.

The short-circuit member 376 covers the short-circuit hole 375 of the cap plate 371. The short-circuit member 376 has a downwardly convex plate shape when an inside of the case 180 is at a normal operating pressure. If the inside pressure of the case 180 and the cap assembly 370 increases to or exceeds a certain pressure (e.g., a predetermined or set value), the short-circuit member 376 may be reversed to an upwardly convex shape. The short-circuit member 376 and the cap plate 371 may have the same polarity. As the short-circuit member 376 is reversed into an upwardly convex shape, the short-circuit member 376 comes into contact with a bottom surface of the short-circuit plate 125 which is disposed above the short-circuit member 376, and thus a short circuit is formed due to the short-circuit plate 125 and the short-circuit member 376 having different electrical polarities.

According to embodiments of the present invention, a secondary battery includes the auxiliary connection part such that an electrode can be electrically connected to the cap plate or the case.

In addition, according to embodiments of the present invention, a secondary battery includes at least two fuse parts at the collecting part such that an outward current can be interrupted when the secondary battery is overcharged. Secondary batteries according to embodiments of the present invention may thereby have improved safety as a motor-driving power source for propelling electric scooters, hybrid vehicles, or electric vehicles.

While some exemplary embodiments of a secondary battery have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and equivalents thereof.

What is claimed is:

1. A secondary battery comprising:
   an electrode assembly comprising a first electrode, a second electrode, and a separator between the first and second electrodes;
   a first collecting part electrically connected to the first electrode;
   a second collecting part electrically connected to the second electrode;
   a case configured to receive the electrode assembly;
   a cap assembly comprising a cap plate configured to seal an opening of the case; and
   an auxiliary connection part electrically connected between the second collecting part and the cap plate,
   wherein the second collecting part comprises:
      at least two fuse parts;
      a first extension part; and
      a second extension part connected to the second electrode, and
   wherein a first end of the auxiliary connection part is connected to a fixing part of the second collecting part between first and second fuse parts of the at least two fuse parts, and a second end of the auxiliary connection part is connected to a bottom surface of the cap plate or an inner side of the case.

2. The secondary battery as claimed in claim 1,
   wherein the first and second fuse parts are arranged on the second collecting part and spaced apart from each other, and
   wherein the first and second fuse parts include penetration holes formed through the second collecting part, respectively.

3. A secondary battery comprising:
   an electrode assembly comprising a first electrode, a second electrode, and a separator between the first and second electrodes;
   a first collecting part electrically connected to the first electrode;
   a second collecting part electrically connected to the second electrode;
   a case configured to receive the electrode assembly;
   a cap assembly comprising a cap plate configured to seal an opening of the case; and
   an auxiliary connection part electrically connected between the second collecting part and the cap plate,
   wherein the second collecting art comprises:
      at least two fuse parts;
      a first extension part; and
      a second extension part connected to the second electrode,
   wherein the at least two fuse parts comprise first and second fuse parts arranged on the second collecting part and spaced apart from each other,
   wherein the first and second fuse parts include penetration holes formed through the second collecting part, respectively,
   wherein the first extension part is fixed to and electrically connected to a bottom surface of the cap plate, and
   wherein the first and second fuse parts are arranged on the second extension part extending at an angle from the first extension part.

4. The secondary battery as claimed in claim 2,
   wherein the second extension part comprises the fixing part between the first fuse part and the second fuse part, and
   wherein the second end of the auxiliary connection part is connected to the bottom surface of the cap plate.

5. A secondary battery comprising:
   an electrode assembly comprising a first electrode, a second electrode, and a separator between the first and second electrodes;
   a first collecting part electrically connected to the first electrode;
   a second collecting part electrically connected to the second electrode;
   a case configured to receive the electrode assembly;

a cap assembly comprising a cap plate configured to seal an opening of the case; and
an auxiliary connection part electrically connected between the second collecting part and the cap plate,
wherein the second collectin part comprises:
at least two fuse parts;
a first extension part; and
a second extension part connected to the second electrode,
wherein the at least two fuse parts comprise first and second fuse parts arranged on the second collecting part and spaced apart from each other,
wherein the first and second fuse parts include penetration holes formed through the second collecting part, respectively, and
wherein the penetration hole of the first fuse part is larger than the penetration hole of the second fuse part.

6. The secondary battery as claimed in claim 2,
wherein the second extension part comprises the fixing part between the first fuse part and the second fuse part, and
wherein the second end of the auxiliary connection part is connected to the inner side of the case.

7. A secondary battery comprising:
an electrode assembly comprising a first electrode, a second electrode, and a separator between the first and second electrodes;
a first collecting part electrically connected to the first electrode;
a second collecting part electrically connected to the second electrode;
a case configured to receive the electrode assembly;
a cap assembly comprising a cap plate configured to seal an opening of the case; and
an auxiliary connection part electrically connected between the second collecting part and the cap plate,
wherein the second collecting part comprises:
at least two fuse parts;
a first extension part; and
a second extension part connected to the second electrode,
wherein the first collecting part comprises a first electrode terminal inserted through a first terminal hole of the cap plate,
wherein the first electrode terminal comprises a short-circuit plate,
wherein the cap plate has a short-circuit hole at a location corresponding to the short-circuit plate, and
wherein the cap assembly further comprises a short-circuit member covering the short-circuit hole.

8. The secondary battery as claimed in claim 7, wherein the short-circuit member comprises a reversible plate comprising:
an edge part fixed to the cap plate; and
a convex part extending from the edge part into the short-circuit hole.

9. The secondary battery as claimed in claim 8, wherein the convex part is configured to contact the short-circuit plate when an inside pressure of the secondary battery exceeds a reference pressure.

10. The secondary battery as claimed in claim 9, wherein when the convex part contacts the short-circuit plate, the first and second fuse parts are configured to disconnect at regions between edges of the penetration holes of the respective first and second fuse parts and edges of the second extension part to interrupt a current.

11. A secondary battery comprising:
an electrode assembly comprising a first electrode, a second electrode, and a separator between the first and second electrodes;
a first collecting part electrically connected to the first electrode;
a second collecting part electrically connected to the second electrode;
a case configured to receive the electrode assembly;
a case assembly comprising a cap plate configured to seal an opening of the case; and
an auxiliary connection part electrically connected between the second collecting part and the cap plate,
wherein the second collecting part comprises:
at least two fuse parts;
a first extension part; and
a second extension part connected to the second electrode, and
wherein the first and second collecting parts comprise first and second electrode terminals protruding outward from the cap plate, respectively.

12. The secondary battery as claimed in claim 11, wherein the at least two fuse parts comprise:
a first fuse part arranged on the first extension part; and
a second fuse part arranged on the second extension part extending at an angle from the first extension part.

13. The secondary battery as claimed in claim 11,
wherein the first and second electrode terminals are inserted through terminal holes formed in the cap plate and protrude outward from the cap plate,
wherein the first electrode terminal comprises a short-circuit plate,
wherein the cap plate has a short-circuit hole at a location corresponding to the short-circuit plate, and
wherein the cap assembly further comprises a short-circuit member covering the short-circuit hole.

14. The secondary battery as claimed in claim 13, wherein the short-circuit member comprises a reversible plate comprising:
an edge part fixed to the cap plate; and
a convex part extending from the edge part into the short-circuit hole.

15. The secondary battery as claimed in claim 14, wherein the convex part is configured to contact the short-circuit plate when an inside pressure of the secondary battery exceeds a reference pressure.

16. The secondary battery as claimed in claim 15, wherein when the convex part contacts the short-circuit plate, the first and second fuse parts are configured to disconnect at regions between edges of penetration holes of the respective first and second fuse parts and edges of the second extension part to interrupt a current.

17. The secondary battery as claimed in claim 11, further comprising insulation members between the cap plate and the first and second electrode terminals.

* * * * *

UNITED STATES PATENT AND TRADEMARK OFFICE
CERTIFICATE OF CORRECTION

PATENT NO. : 8,758,929 B2  Page 1 of 1
APPLICATION NO. : 13/180480
DATED : June 24, 2014
INVENTOR(S) : Sangwon Byun et al.

It is certified that error appears in the above-identified patent and that said Letters Patent is hereby corrected as shown below:

In the Claims

Col. 12, line 37, Claim 3    Delete "collecting art",

Insert --collecting part--

Col. 13, line 5, Claim 5     Delete "collectin",

Insert --collection--

Col. 14, line 13, Claim 11   Delete "case assembly",

Insert --cap assembly--

Signed and Sealed this
Twenty-sixth Day of July, 2016

Michelle K. Lee
*Director of the United States Patent and Trademark Office*